US012751568B2

(12) United States Patent
Blackmore, Jr.

(10) Patent No.: US 12,751,568 B2
(45) **Date of Patent: *Oct. 6, 2026**

(54) HORTICULTURE TRAY SUPPORT SYSTEM

(71) Applicant: Blackmore Company, Inc., Belleville, MI (US)

(72) Inventor: Fred N. Blackmore, Jr., Belleville, MI (US)

(73) Assignee: Blackmore Company, Inc., Belleville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,603

(22) Filed: Feb. 27, 2024

(65) Prior Publication Data

US 2024/0197089 A1 Jun. 20, 2024

Related U.S. Application Data

(63) Continuation of application No. 17/502,811, filed on Oct. 15, 2021, now Pat. No. 11,925,285.

(51) Int. Cl.
*A47G 7/04* (2006.01)
*A01G 9/02* (2018.01)

(52) U.S. Cl.
CPC ............. *A47G 7/041* (2013.01); *A01G 9/027* (2013.01); *A01G 9/028* (2013.01)

(58) Field of Classification Search
CPC .......... A01G 9/027; A01G 9/02; A01G 9/028; A01G 9/0297; A47G 7/041; A47G 7/042;
(Continued)

(56) References Cited

U.S. PATENT DOCUMENTS 3,542,210 A * 11/1970 Sorensen ............... A01G 9/045 47/75
3,599,558 A * 8/1971 Goldberg .............. A47J 37/067 99/339

(Continued)

FOREIGN PATENT DOCUMENTS

CA 3113298 A1 5/2020
CN 2860051 Y 1/2007

(Continued)

OTHER PUBLICATIONS

International Search Report and Written Opinion regarding International Application No. PCT/US2022/046881, dated Feb. 2, 2023.

(Continued)

*Primary Examiner* — Kristen C Hayes

(57) ABSTRACT

A movable horticulture tray carrier system including a plurality of horticulture trays. Each one of the plurality of horticulture trays defines a plurality of growing cells. A stand includes a plurality of vertical supports spaced apart along a length of the stand. A horizontal support extends along the length of the stand between at least two of the plurality of vertical supports. The stand is configured to support the plurality of horticulture trays above a surface that the plurality of vertical supports are seated on to provide an air gap between a lower surface of each one of the plurality of growing cells and the surface that the plurality of vertical supports are seated on, the air gap facilitates root pruning, facilitates lateral root growth to reduce root circling, and facilitates disease prevention of plants being grown in the plurality of growing cells.

6 Claims, 8 Drawing Sheets

(58) Field of Classification Search
CPC .......... A47G 7/045; A47G 7/044; A47G 7/02; A47G 7/00; A47F 7/0078; B65D 1/36; A21B 3/13; A21B 3/155; A21B 3/131; A21B 3/132
USPC ..................................................... 211/126.11
See application file for complete search history.

(56) References Cited

U.S. PATENT DOCUMENTS

| | | | | |
|---|---|---|---|---|
| 3,701,326 | A | 10/1972 | Herman | |
| 3,784,044 | A | 1/1974 | Bruggeman et al. | |
| 3,866,788 | A | 2/1975 | Smit | |
| 3,938,281 | A | 2/1976 | Ingerstedt et al. | |
| 4,658,542 | A | 4/1987 | Holmberg | |
| 4,756,119 | A * | 7/1988 | Chabot | A01G 9/0299 108/127 |
| 4,802,588 | A | 2/1989 | Silvola | |
| 4,878,313 | A | 11/1989 | Polesel | |
| 6,029,399 | A | 2/2000 | Mercer | |
| 10,231,387 | B2 | 3/2019 | Blackmore, Jr. | |
| 10,477,781 | B2 | 11/2019 | Blackmore, Jr. | |
| 11,116,147 | B1 * | 9/2021 | Chojnacki | A01G 9/0297 |
| 2007/0137101 | A1 | 6/2007 | van Heugten | |
| 2008/0115413 | A1 | 5/2008 | Blackmore | |
| 2009/0001035 | A1 * | 1/2009 | Mulholland | A47F 7/0078 211/85.23 |
| 2015/0068122 | A1 | 3/2015 | Juncal et al. | |
| 2017/0217051 | A1 * | 8/2017 | Viancin | B29C 33/3842 |

FOREIGN PATENT DOCUMENTS

| | | | |
|---|---|---|---|
| CN | 201733663 | U | 2/2011 |
| CN | 203446283 | U | 2/2014 |
| CN | 206547454 | U | 10/2017 |
| CN | 207836347 | U | 9/2018 |
| CN | 110959422 | A | 4/2020 |
| EP | 02210481 | A1 | 7/2010 |
| EP | 2380430 | A1 | 10/2011 |
| EP | 2537411 | B1 | 9/2013 |
| FR | 2559998 | A1 | 8/1985 |
| FR | 2661155 | A1 | 10/1991 |
| JP | 3045665 | U | 2/1998 |
| JP | 2001078576 | A | 3/2001 |
| JP | 2009219400 | A | 10/2009 |
| JP | 4948034 | B2 | 6/2012 |
| KR | 2011-0018637 | A | 2/2011 |
| KR | 2018-0075280 | A | 7/2018 |
| KR | 102184907 | B1 | 12/2020 |
| KR | 20210036959 | A | 4/2021 |
| WO | 2009/083775 | A1 | 7/2009 |
| WO | WO-2020/030825 | A1 | 2/2020 |

OTHER PUBLICATIONS

Japanese Office Action from counterpart JP2024521809, dated Feb. 20, 2025.

New Zealand Office Action from counterpart Application No. 810161, dated Sep. 30, 2025.

Australian Office Action from counterpart Application No. 2022364873, dated Oct. 28, 2025.

European Search Report regarding Application No. PCT/US2022046881, dated Jul. 28, 2025.

Chinese Office Action from counterpart CN2022800692965, dated Jul. 21, 2025.

Korean Office Action from counterpart KR 10-2024-7015892, dated Mar. 10, 2026.

Chinese Office Action from counterpart CN 202280069296.5, dated Mar. 2, 2026.

Chinese Office Action from counterpart CN2022800692965, dated Jun. 16, 2026.

Canadian Office Action from counterpart CA3,240,631, dated Mar. 17, 2026.

* cited by examiner

HORTICULTURE TRAY SUPPORT SYSTEM

CROSS-REFERENCE TO RELATED PATENT APPLICATION

This application is a continuation patent application of U.S. application Ser. No. 17/502,811 filed on Oct. 15, 2021, which is incorporated herein by reference in its entirety.

FIELD

The present disclosure relates to a horticulture tray support system including a stand configured to support a horticulture tray above a ground surface.

BACKGROUND

This section provides background information related to the present disclosure, which is not necessarily prior art.

Horticulture trays are widely used to grow plants, flowers, vegetables, etc. While existing trays are suitable for their intended use, they are subject to improvement. The present disclosure advantageously provides for an improved horticulture tray support system that facilitates watering, enhances root pruning, improves soil health, and improves the overall health of the plant, flower, etc. being grown. The present disclosure provides numerous additional advantages as well, as explained in detail herein and as one skilled in the art will appreciate.

SUMMARY

This section provides a general summary of the disclosure, and is not a comprehensive disclosure of its full scope or all of its features.

The present disclosure provides for a movable horticulture tray carrier system including a plurality of horticulture trays. Each one of the plurality of horticulture trays defines a plurality of growing cells. A stand includes a plurality of vertical supports spaced apart along a length of the stand. A horizontal support extends along the length of the stand between at least two of the plurality of vertical supports. The stand is configured to support the plurality of horticulture trays above a surface that the plurality of vertical supports are seated on to provide an air gap between a lower surface of each one of the plurality of growing cells and the surface that the plurality of vertical supports are seated on, the air gap facilitates root pruning, facilitates lateral root growth to reduce root circling, and facilitates disease prevention of plants being grown in the plurality of growing cells.

The present disclosure further provides for a movable horticulture tray carrier system including a plurality of horticulture trays. Each one of the plurality of horticulture trays defines a plurality of growing cells with gaps therebetween. A stand includes a plurality of vertical supports evenly spaced apart along a length of the stand. First and second horizontal supports extend in parallel along an entirety of the length of the stand between at least two of the plurality of vertical supports. The first and the second horizontal supports are spaced apart such that when the plurality of horticulture trays are seated on the stand the first horizontal support sits in a first one of the gaps and the second horizontal support sits in a second one of the gaps. The stand is configured to support the plurality of horticulture trays above a surface that the plurality of vertical supports are seated on to provide an air gap between a lower surface of each one of the plurality of growing cells and the surface that the plurality of vertical supports are seated on, the air gap facilitates root pruning, facilitates lateral root growth to reduce root circling, and facilitates disease prevention of plants being grown in the plurality of growing cells.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
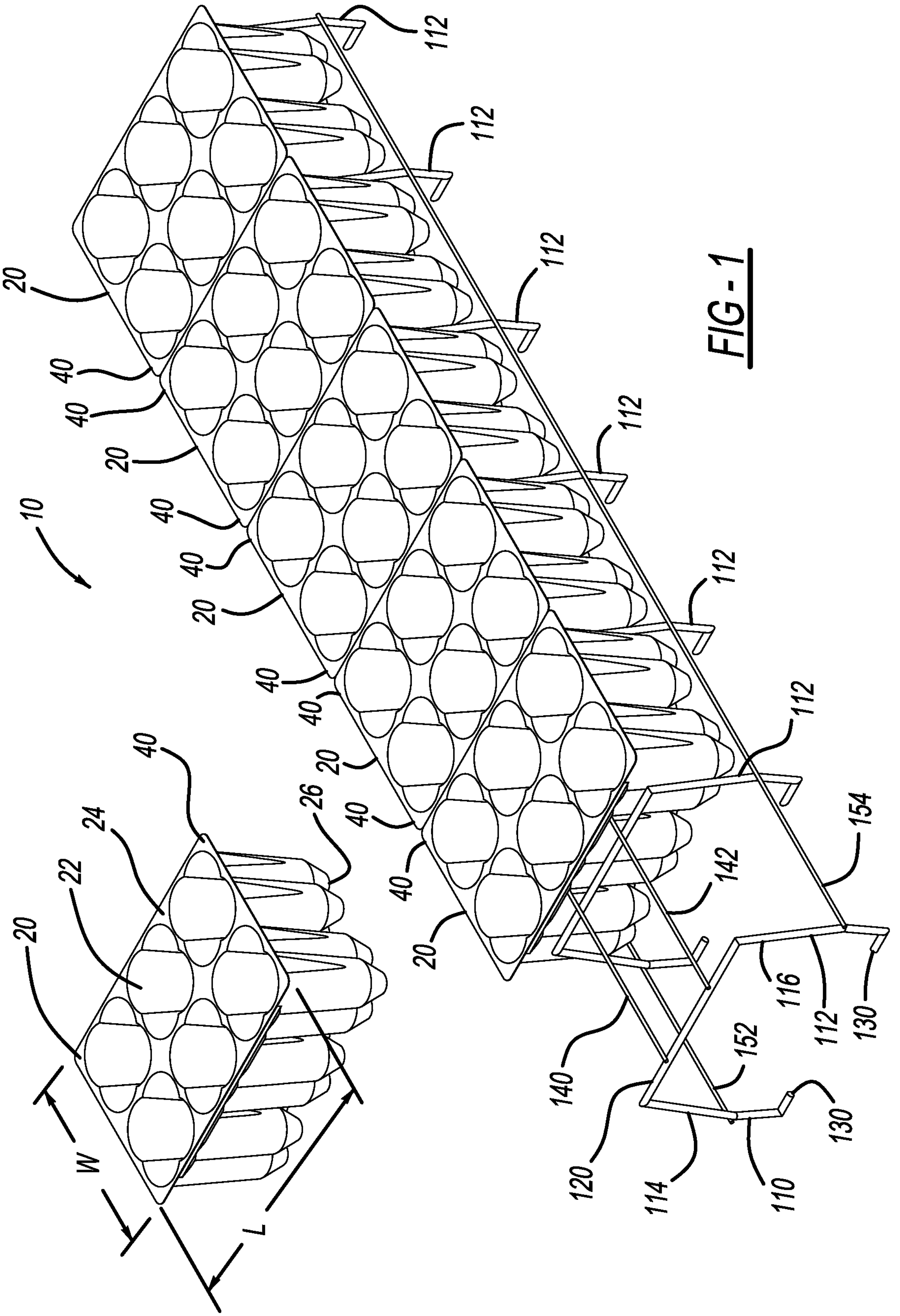
FIG. 1 illustrates a horticulture tray support system in accordance with the present disclosure, the system including a stand and a plurality of horticulture trays each with six growing cells.
Figure 2:
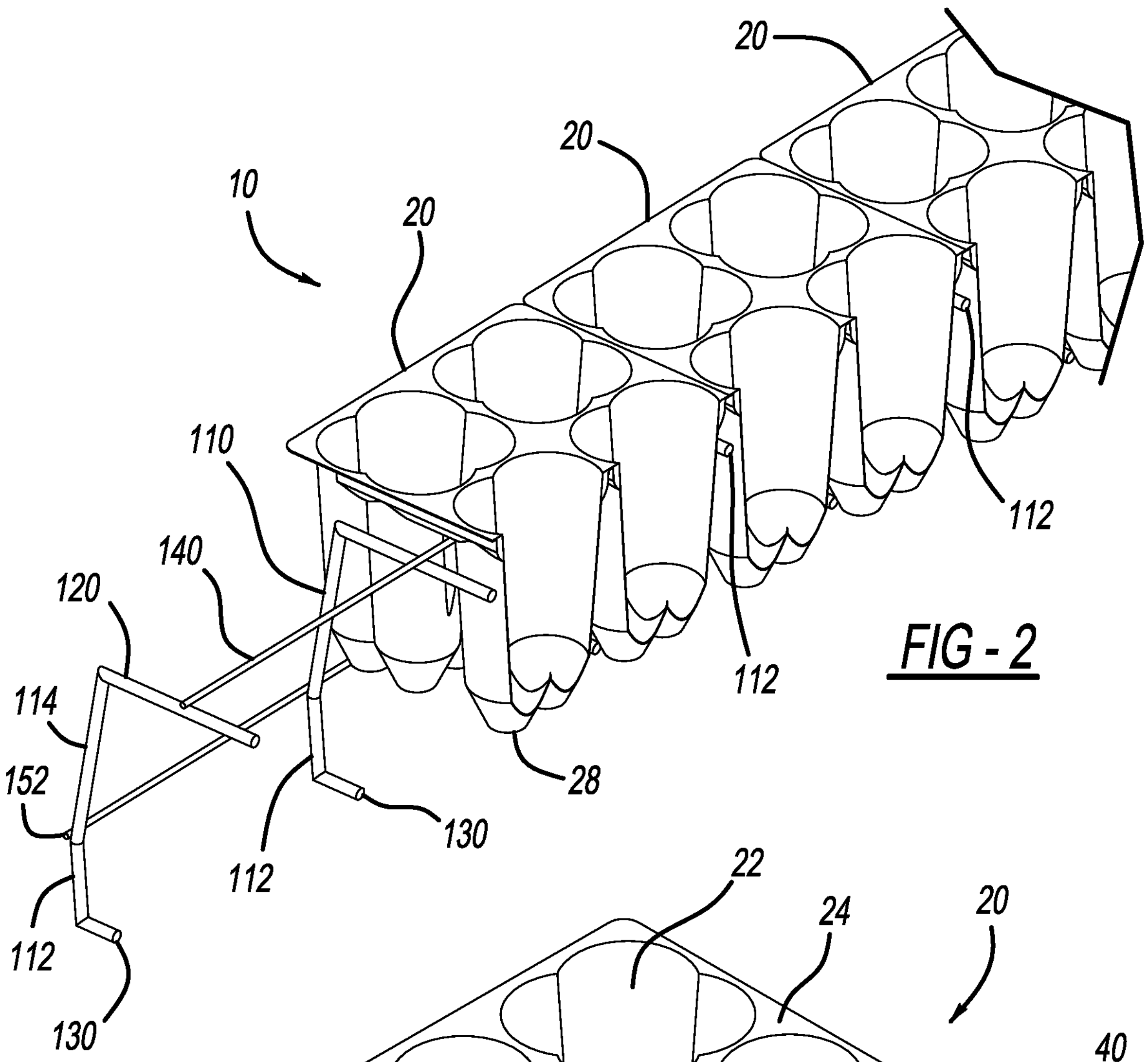
FIG. 2 is a close-up, cross-sectional view of the stand and the horticulture trays of FIG. 1.
Figure 3:
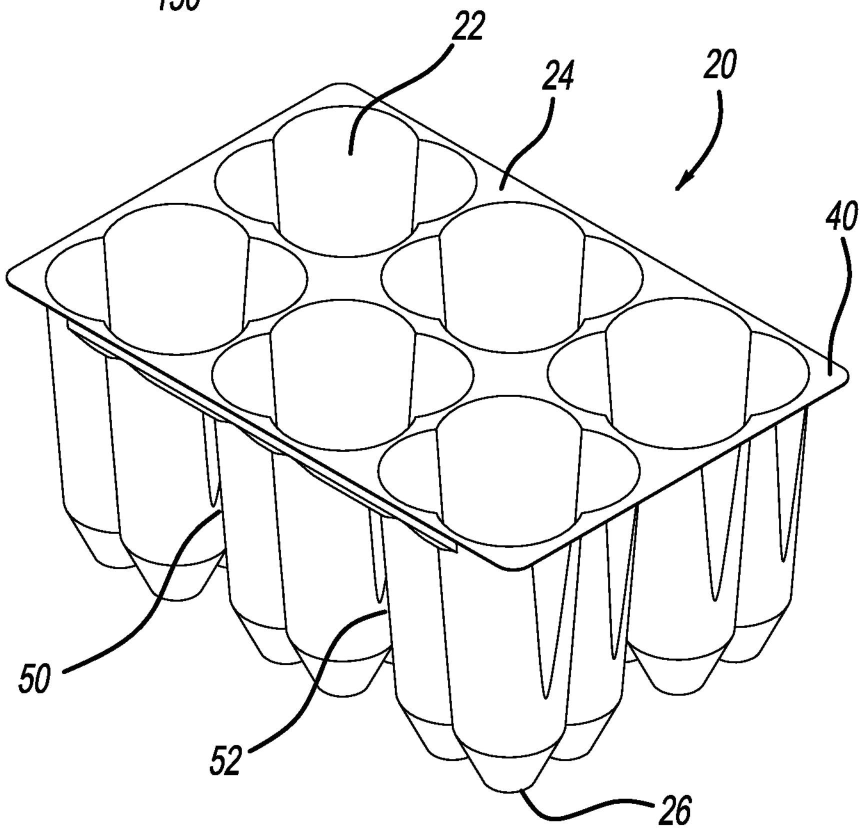
FIG. 3 is a perspective view of one of the horticulture trays of the system of FIG. 1.

With initial reference to FIGS. 1 and 2, the present disclosure is directed to an improved horticulture tray support system 10. The system 10 generally includes a plurality of horticulture trays 20 and a stand 110 configured to support the plurality of horticulture trays 20 above any suitable surface 500 (see FIGS. 6, 7, 9, 10, 11, and 12, for example), such as a ground surface or a floor of a building, such as a greenhouse, for example. The horticulture trays 20 are configured for cooperating with the stand 110, as explained in detail herein.

Figure 4:
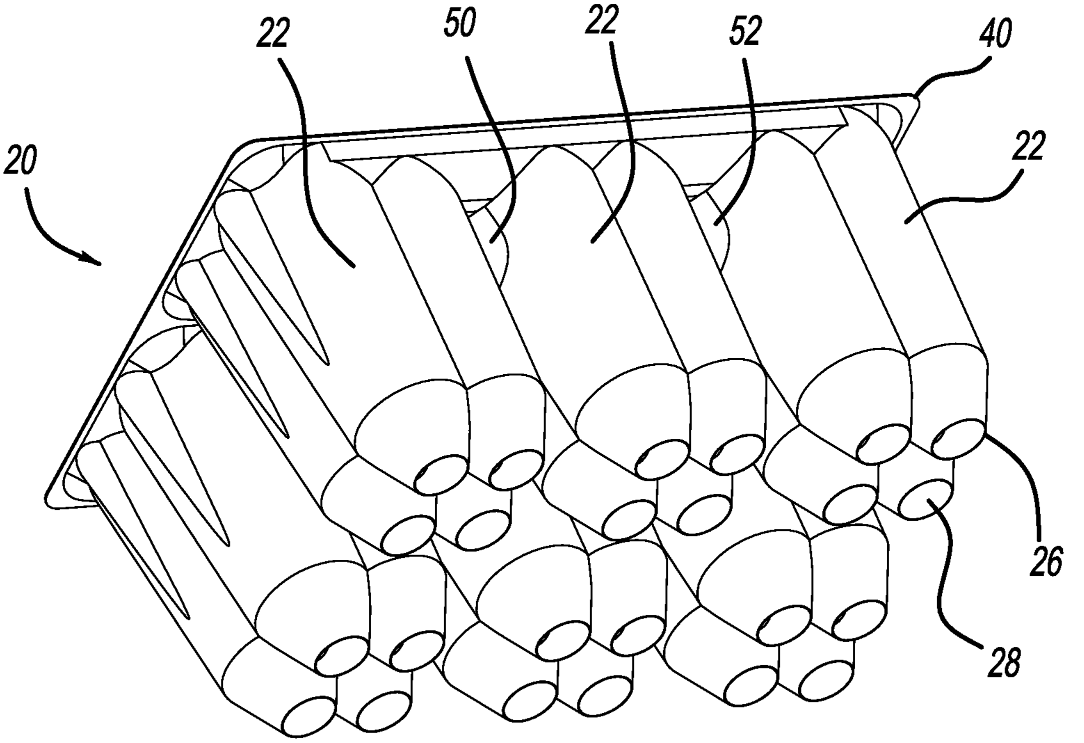
FIG. 4 is another perspective view of one of the horticulture trays of the system of FIG. 1.

The horticulture trays 20 may all be identical, or have varied shapes and sizes. Each tray 20 includes a plurality of growing cells 22. Each one of the growing cells 22 is a receptacle extending from an upper surface 24 to lower surface 26 of the trays. At the lower surface 26, each one of the growing cells 22 defines one or more openings 28 (see FIGS. 2 and 4, for example). Each one of the growing cells 22 may have any suitable shape and size. In the examples illustrated, each growing cell 22 has a plurality of rounded surfaces adjoined to one another. Each rounded surface is generally concave relative to an axial center of the growing cells 22. Each tray 20 may include any suitable number of growing cells 22. For example and as illustrated in at least FIGS. 1-4, 7, and 8, each tray 20 includes six growing cells 22. The six growing cells 22 are arranged in two rows of three, with three of the growing cells 22 aligned along a tray length L, and two of the growing cells 22 aligned along a tray width W.

Each one of the horticulture trays 20 includes an edge 40 extending around the upper surface 24. With particular reference to FIGS. 3, 4, 7, and 8, each tray 20 defines gaps just below the edge 40 between adjacent growing cells 22. For example, the trays 20 define a first gap 50 and a second gap 52. As explained further herein, the gaps 50, 52 are sized and shaped to accommodate portions of the stand 110 to facilitate cooperation between the trays 20 and the stand 110.

The trays 20 may be any suitable horticulture trays, such as those disclosed in U.S. Pat. No. 10,477,781 titled "Plant Tray," which was filed on Oct. 18, 2016 and was issued as a patent by the USPTO on Nov. 19, 2019 and is incorporated herein by reference in its entirety. FIGS. 9-12 illustrate another embodiment of the horticulture trays 20, which are substantially identical to the trays illustrated in FIGS. 1-4, 7, and 8, but include eight of the growing cells 22 arranged in two rows with four of the cells 22 aligned along the tray length L and two of the growing cells 22 aligned along the tray width W. Any other horticulture trays suitable for cooperation with the stand 110 may also be included with the system 10.

Figure 6:
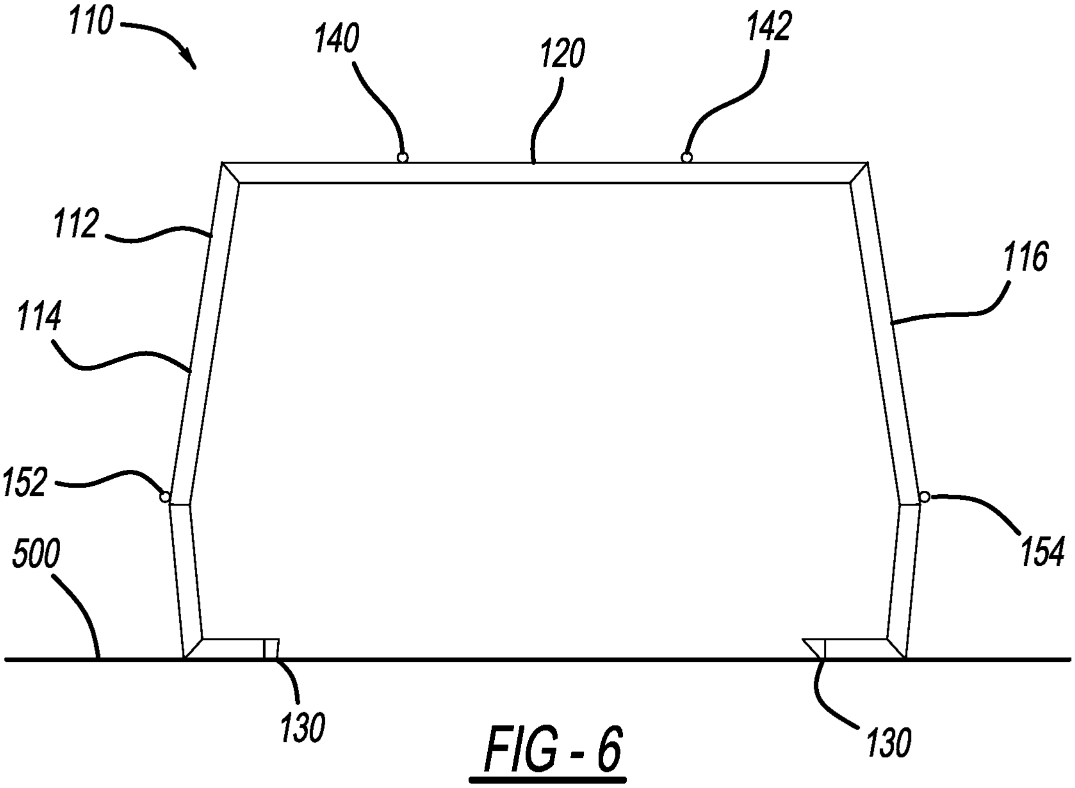
FIG. 6 is a side view of the stand of the system of FIG. 1.
Figure 5:
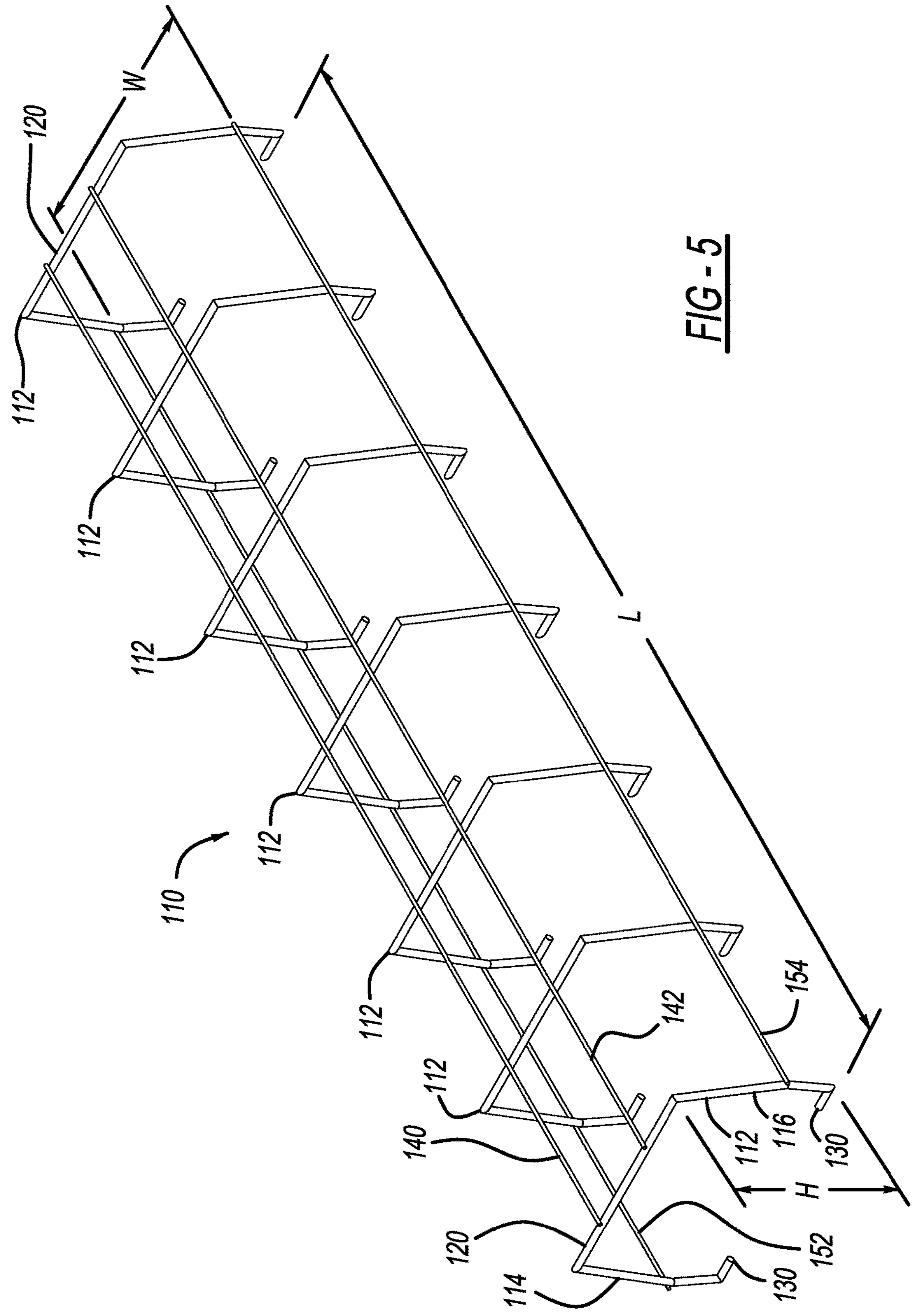
FIG. 5 is a perspective view of the stand of the system of FIG. 1.
Figure 7:
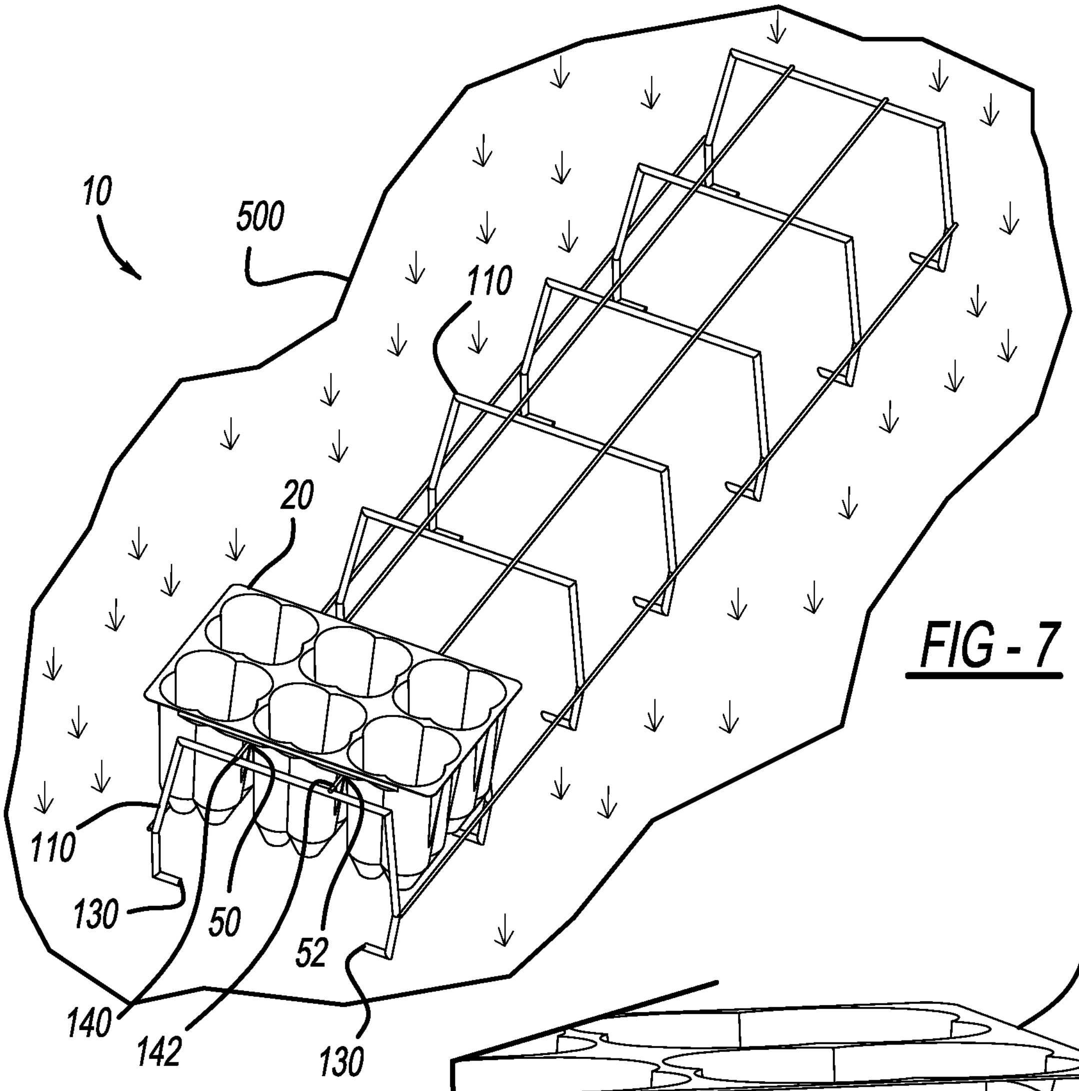
FIG. 7 is a perspective view illustrating cooperation between one of the horticulture trays and the stand of the system of FIG. 1.
Figure 8:
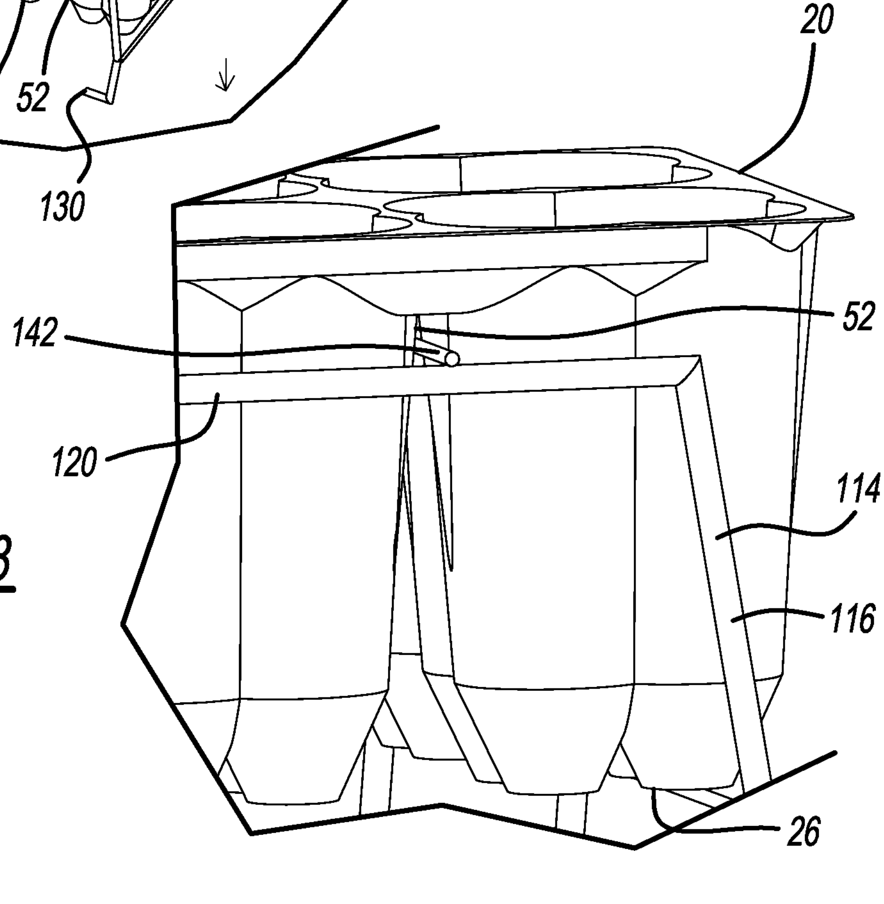
FIG. 8 is illustrates the cooperation between one of the horticulture trays and the stand of the system of FIG. 1 in greater detail.
Figure 9:
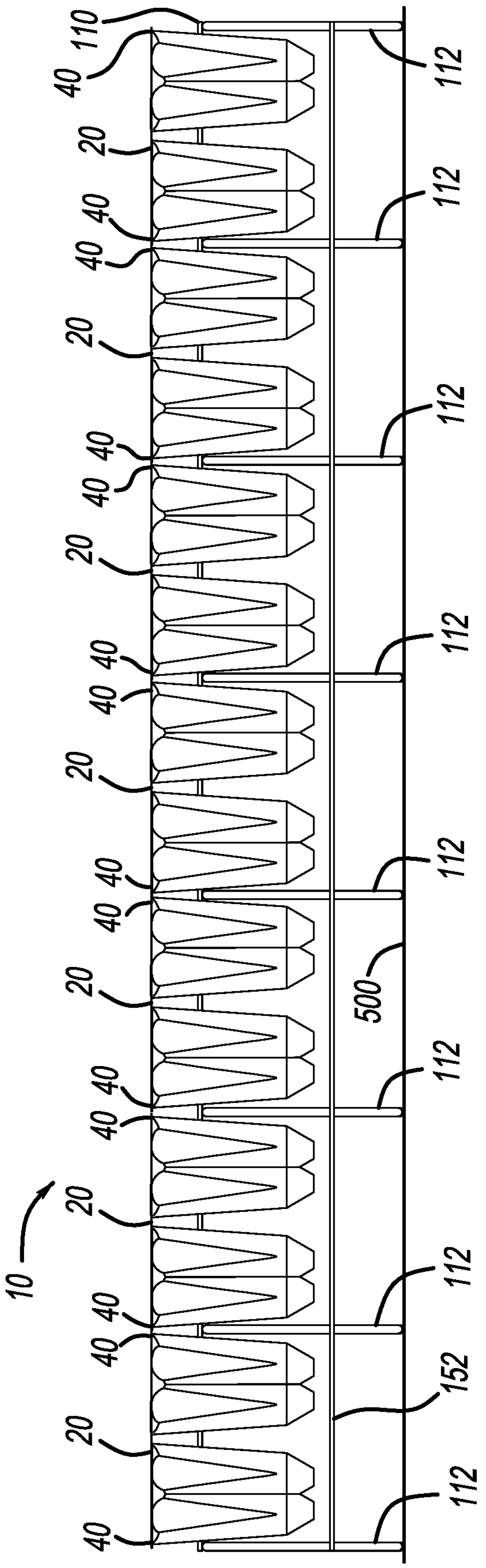
FIG. 9 is a side view of the horticulture tray support system in accordance with the present disclosure, the system including the stand and the plurality of horticulture trays each with eight growing cells.
Figure 10:
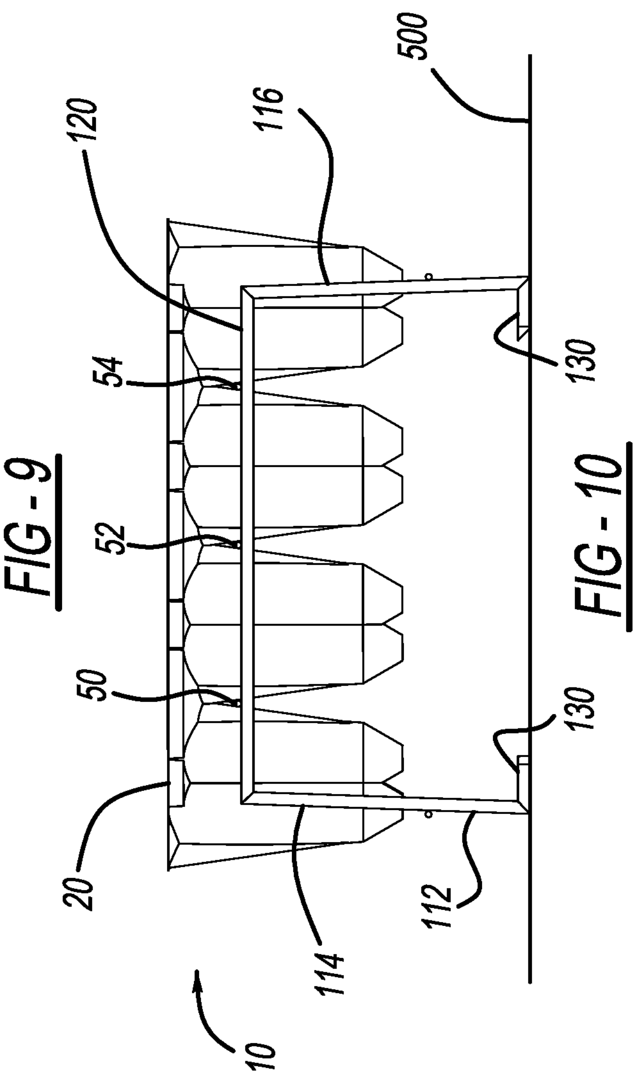
FIG. 10 is an end view of FIG. 9.

The stand 110 will now be described further. With particular reference to FIGS. 5 and 6, the stand 110 includes a plurality of vertical supports 112, which are evenly spaced apart along a stand length L of the stand 110. Each one of the vertical supports 112 is the same, or substantially similar, and thus the description of one of the vertical supports 112 generally applies to the other vertical supports 112.

Each one of the vertical supports 112 includes the first side portion 114 and a second side portion 116. The first and second side portions 114, 116 generally extend vertically up to a crossbar 120. The crossbar 120 extends horizontally along a width W of the stand 110. The first and second side portions 114, 116 extend generally vertically along a stand height H of the stand 110.

At the bottom ends of each of the first side portion 114 and the second side portion 116, opposite to the crossbar 120, are feet 130. Each one of the feet 130 extends inward towards a center of the stand 110 generally parallel to the crossbar 120. The feet 130 are configured to support the stand 110 upright on any suitable surface 500.

The stand 110 further includes at least one upper horizontal support member, such as a first upper horizontal support member 140 and a second upper horizontal support member 142. Each one of the first and second upper horizontal support members 140, 142 extends perpendicular to the crossbar 120. The first and second upper horizontal support members 140, 142 may continuously extend across the entire stand length L, or may each be configured as a plurality of individual support members aligned along the stand length L.

Each one of the vertical supports 112 is spaced apart along the stand length L to accommodate a single one of the plurality of horticulture trays 20 between two of the vertical supports 112 when the trays 20 are arranged as illustrated in FIGS. 1 and 2 (for example) with the trays 20 arranged such that the tray length L is perpendicular to the stand length L and the tray width W is perpendicular to the stand width W. The first and second upper horizontal support members 140, 142 are spaced apart to accommodate a single one of the growing cells 22 therebetween along the stand width W. Thus with the trays 20 seated on the stand 110, the first upper horizontal support member 140 is seated in the first gap 50 of the tray 20 and the second upper horizontal support member 142 is seated in the second gap 52 of the tray 20 so as to securely support the tray 20 on the stand 110 (see FIGS. 7 and 8, for example). With respect to the stand length L, a plurality of the cells 22 of the trays 20 are arranged linearly along the stand length L.

The stand 110 further includes a first side bar 152 and a second side bar 154. Each one of the first and second side bars 152, 154 extend along the stand length L generally parallel to the first and second upper horizontal support members 140. The first side bar 152 connects each of the vertical supports 112 at the first side portions 114 thereof. The second side bar 154 connects each of the vertical supports 112 at the second side portions 116 thereof. The first and second side bars 152, 154 may extend continuously along the stand length L, or may each be a plurality of individual rods or members extending along the stand length L.

The stand 110 advantageously supports the plurality of growing cells 22 above the ground surface 500 to provide a gap between the lower surface 26 of each one of the cells 22 and the ground surface 500. This gap advantageously provides an air gap that facilitates root pruning and helps to prevent disease in the items being grown. The gap also provides for a forklift pick-up beneath the first and second side portions 114, 116.

With reference to FIGS. 9-12, the horticulture tray support system 10 is illustrated including the larger horticulture trays 20, each of which has eight of the growing cells 22. To accommodate the additional number of growing cells 22, the stand 110 includes a third upper horizontal support member 144 (see FIG. 11) extending along the stand length L, which sits within third gap 54 between growing cells 22 (see FIGS. 10 and 11). Thus with the larger trays 20 seated on the stand 110, the first and second upper horizontal support members 140, 142 are spaced apart to accommodate a single row of the growing cells 22 extending along the stand length L, and the second and third upper horizontal support members 142, 144 are spaced apart to accommodate a single row of the growing cells 22 extending along the stand length L.

Figure 11:
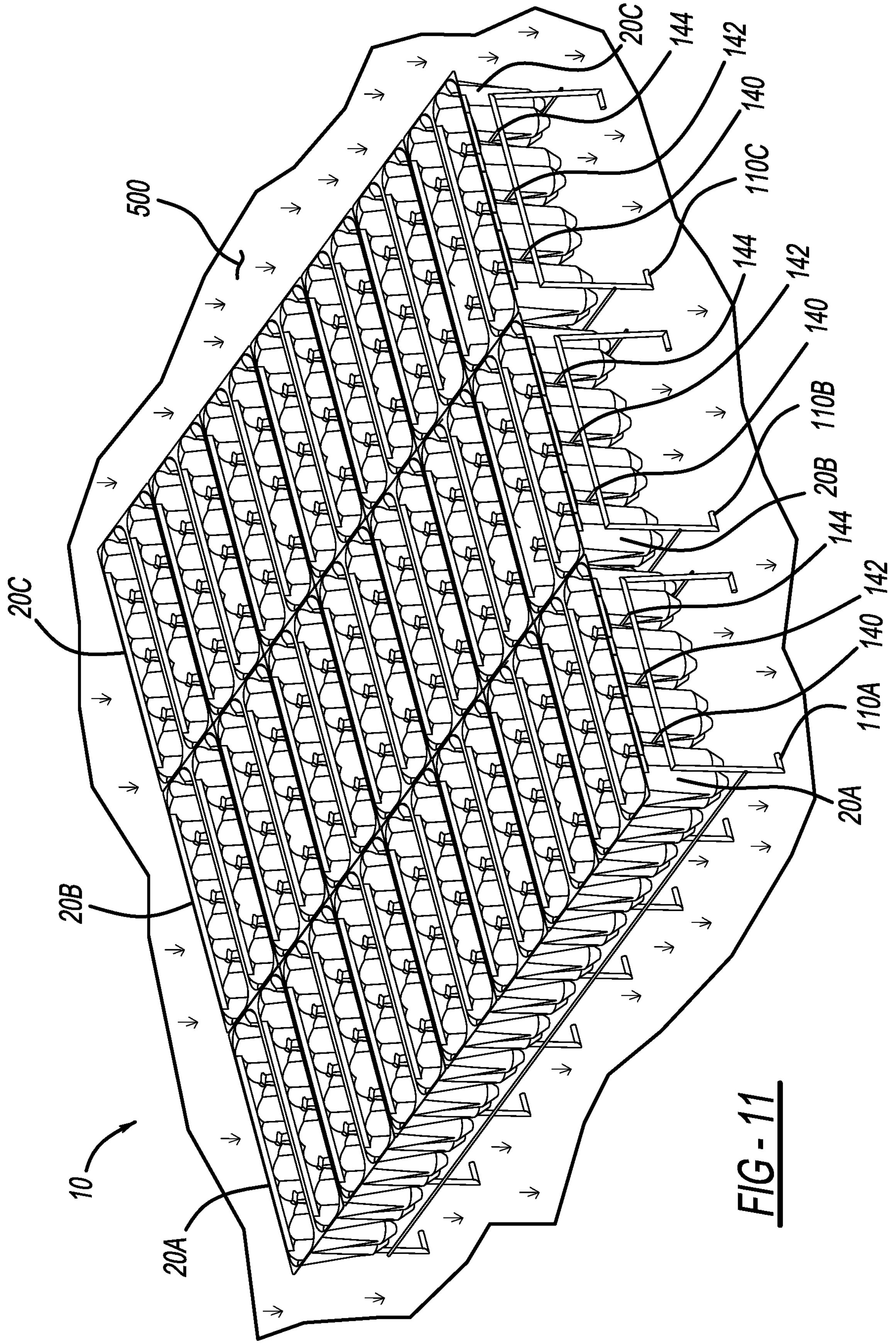
FIG. 11 is a perspective view of the horticulture tray support system in accordance with the present disclosure including a plurality of stands arranged adjacent to one another, and a plurality of the horticulture trays each including eight cells abutting one another.
Figure 12:
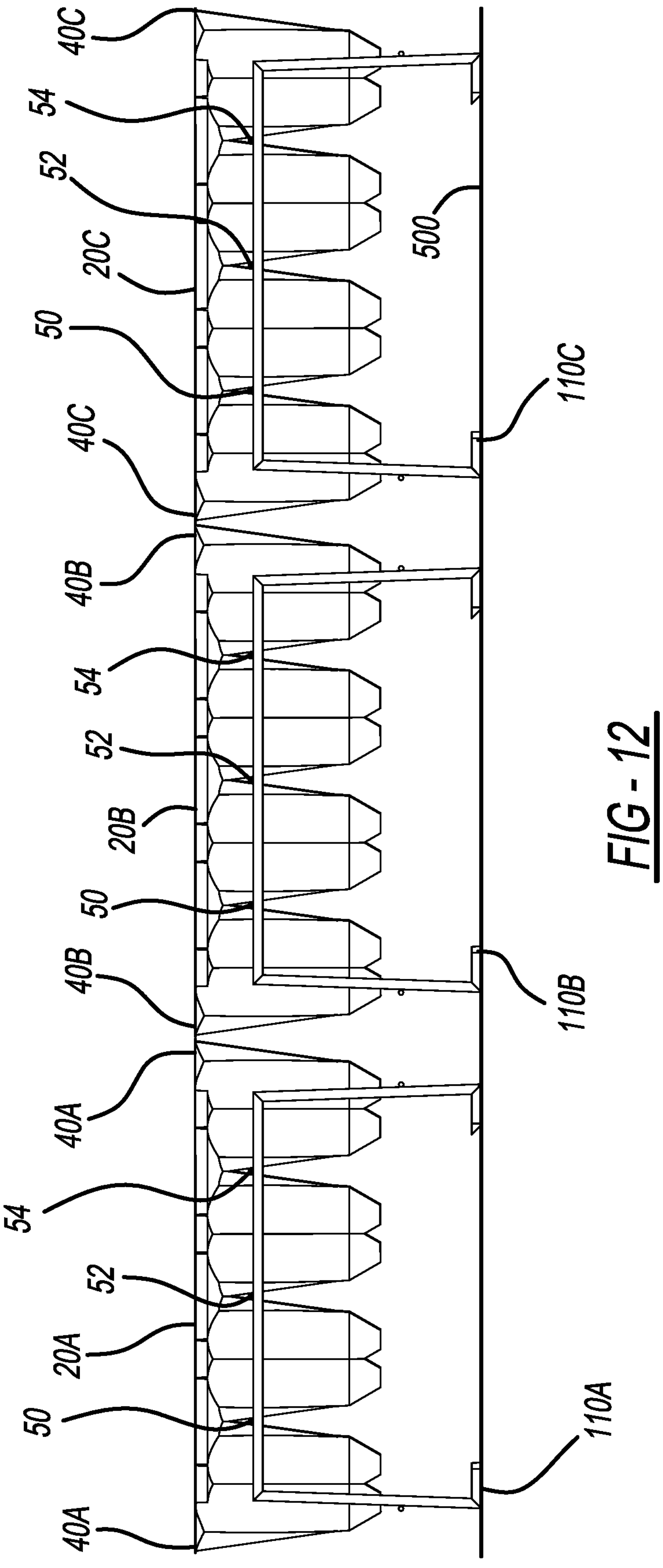
FIG. 12 is a side view of FIG. 11.

The system 10 includes a plurality of the stands 110 arranged side by side such that the trays 20 supported by adjacent ones of the stands 110 abut one another. For example and as illustrated in FIGS. 11 and 12, three of the stands 110 are arranged side by side. Specifically, a first stand 110A is adjacent to a second stand 110B. The second stand 110B is adjacent to a third stand 110C. Thus second stand 110B is between the first stand 110A and the third stand 110C. Trays 20A supported by the first stand 110A directly abut trays 20B supported by the second stand 110B such that first edges 40A of the first trays 20A directly abut second edges 40B of the second trays 20B. The second edges 40B of the second trays 20B also directly abut third edges 40C of third trays 20C. As a result, there are no air gaps between the trays 20A, 20B, and 20C, which promotes even growth of the items being grown. Furthermore, watering is more efficient because nearly all of the water lands on the trays 20A, 20B, 20C and goes to the plants instead of potentially falling through gaps between trays. Such advantages are realized with respect to each individual stand 110 as well because the edges 40 of the trays 20 of each stand also directly abut one another. Still further, the advantages are realized regardless of the size of the trays 20 (e.g., trays 20 having six cells 22, eight cells 22, or any other suitable number of cells). One skilled in the art will appreciate that the present disclosure provides for numerous additional advantages as well.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A movable horticulture tray carrier system comprising:

a plurality of horticulture trays, each one of the plurality of horticulture trays defining a plurality of growing cells with gaps therebetween; and a stand including:

- a plurality of vertical supports evenly spaced apart along a length of the stand; and
- first and second horizontal supports extending in parallel along an entirety of the length of the stand between at least two of the plurality of vertical supports, the first and the second horizontal supports spaced apart such that when the plurality of horticulture trays are seated on the stand the first horizontal support sits in a first one of the gaps and the second horizontal support sits in a second one of the gaps;

wherein:

- the stand is configured to support the plurality of horticulture trays above a surface that the plurality of vertical supports are seated on to provide an air gap between a lower surface of each one of the plurality of growing cells and the surface that the plurality of vertical supports are seated on, the air gap facilitates root pruning, facilitates lateral root growth to reduce root circling, and facilitates disease prevention of plants being grown in the plurality of growing cells;
- the plurality of horticulture trays and the stand are configured such that an outer edge of each one of the plurality of horticulture trays extends beyond the stand such that the plurality of horticulture trays abut adjacent horticulture trays of an adjacent stand;
- the stand is configured to support the plurality of horticulture trays such that they directly abut each other; and
- the plurality of vertical supports are evenly spaced apart at an interval configured to accommodate only a single one of the plurality of horticulture trays between two of the plurality of vertical supports with a length of the single one of the plurality of horticulture trays arranged to extend perpendicular to the length of the stand.

2. The system of claim 1, wherein each one of the plurality of vertical supports includes two side portions that are spaced apart and extend vertically, and a crossbar connecting the two side portions.

3. The system of claim 2, wherein the two side portions each include an inwardly extending foot configured to support the plurality of vertical supports on the surface.

4. The system of claim 1, wherein both the first and the second horizontal supports contact all of the plurality of vertical supports.

5. A movable horticulture tray carrier system comprising:

a plurality of horticulture trays, each one of the plurality of horticulture trays defining a plurality of growing cells with gaps therebetween; and a stand including:

a plurality of vertical supports evenly spaced apart along a length of the stand; and first and second horizontal supports extending in parallel along an entirety of the length of the stand between at least two of the plurality of vertical supports, the first and the second horizontal supports spaced apart such that when the plurality of horticulture trays are seated on the stand the first horizontal support sits in a first one of the gaps and the second horizontal support sits in a second one of the gaps;

wherein:

the stand is configured to support the plurality of horticulture trays above a surface that the plurality of vertical supports are seated on to provide an air gap between a lower surface of each one of the plurality of growing cells and the surface that the plurality of vertical supports are seated on, the air gap facilitates root pruning, facilitates lateral root growth to reduce root circling, and facilitates disease prevention of plants being grown in the plurality of growing cells; and the plurality of vertical supports are evenly spaced apart at an interval configured to accommodate only a single one of the plurality of horticulture trays between two of the plurality of vertical supports with a length of the single one of the plurality of horticulture trays arranged to extend perpendicular to the length of the stand.

6. A movable horticulture tray carrier system comprising:

a plurality of horticulture trays, each one of the plurality of horticulture trays defining a plurality of growing cells with gaps therebetween; and a stand including:

a plurality of vertical supports evenly spaced apart along a length of the stand; and first and second horizontal supports extending in parallel along an entirety of the length of the stand between at least two of the plurality of vertical supports, the first and the second horizontal supports spaced apart such that when the plurality of horticulture trays are seated on the stand the first horizontal support sits in a first one of the gaps and the second horizontal support sits in a second one of the gaps;

wherein:

the stand is configured to support the plurality of horticulture trays above a surface that the plurality of vertical supports are seated on to provide an air gap between a lower surface of each one of the plurality of growing cells and the surface that the plurality of vertical supports are seated on, the air gap facilitates root pruning, facilitates lateral root growth to reduce root circling, and facilitates disease prevention of plants being grown in the plurality of growing cells;

each one of the plurality of vertical supports includes two side portions that are spaced apart and extend vertically, and a crossbar connecting the two side portions; and the two side portions each include an inwardly extending foot configured to support the plurality of vertical supports on the surface.

* * * * *